United States Patent
Li et al.

(10) Patent No.: US 9,605,967 B2
(45) Date of Patent: Mar. 28, 2017

(54) TUNNEL ENTRANCE SPECIFICATION DEVICE AND METHOD THEREOF, COMPUTER PROGRAM FOR SPECIFYING TUNNEL ENTRANCE, AND RECORDING MEDIUM ON WHICH COMPUTER PROGRAM IS RECORDED

(71) Applicant: Toyota Mapmaster Incorporated, Nagoya-shi, Aichi (JP)

(72) Inventors: Cheng Li, Nagoya (JP); Hiroyuki Tamba, Nagoya (JP)

(73) Assignee: Toyota Mapmaster Incorporated (JP)

( * ) Notice: Subject to any disclaimer, the term of this patent is extended or adjusted under 35 U.S.C. 154(b) by 207 days.

(21) Appl. No.: 13/951,291

(22) Filed: Jul. 25, 2013

(65) Prior Publication Data

US 2013/0338921 A1    Dec. 19, 2013

Related U.S. Application Data

(63) Continuation of application No. PCT/JP2011/078567, filed on Dec. 9, 2011.

(30) Foreign Application Priority Data

Jan. 27, 2011  (JP) ................................ 2011-015567
Feb. 23, 2011  (JP) ................................ 2011-036511

(51) Int. Cl.
*G01C 21/26*    (2006.01)
*G01C 21/32*    (2006.01)
(Continued)

(52) U.S. Cl.
CPC ............. *G01C 21/26* (2013.01); *G01C 21/32* (2013.01); *G08G 1/09626* (2013.01); *G08G 1/165* (2013.01); *G09B 29/007* (2013.01)

(58) Field of Classification Search
CPC ..... G09B 29/007; G09B 29/003; G01C 21/26
See application file for complete search history.

(56) References Cited

U.S. PATENT DOCUMENTS 4,344,142 A * 8/1982 Diehr, II et al. ..... B29C 35/0288
                                                      264/325
6,684,155 B1 * 1/2004 Chen et al. ................... 701/117
(Continued)

FOREIGN PATENT DOCUMENTS

JP      9-190525 A    7/1997
JP      2004-037141 A    2/2004
(Continued)

OTHER PUBLICATIONS

Blue Ridge Parkway Tunnels—NC, http://livingnewdeal.org/projects/blue-ridge-parkway-tunnels-nc/, pictures within from 2008, last accessed (Mar. 3, 2015).*
(Continued)

*Primary Examiner* — John Breene
*Assistant Examiner* — Mohammad Islam
(74) *Attorney, Agent, or Firm* — Quarles & Brady LLP; Gavin J. Milczarek-Desai

(57) ABSTRACT

Provided are a device which automatically specifies the elevation and location of a tunnel entrance, and a method thereof. An object entrance for specification of the elevation and/or the location of a tunnel entrance is selected from a map data storage unit. A road link which includes the selected object entrance is designated as an object road link. An elevation of a prescribed region which includes the object entrance is acquired. A boundary is determined between a flat portion and an inclined portion upon the object road link, on the basis of the acquired elevation. The elevation at the determined boundary is specified as the
(Continued)

elevation of the object entrance, and/or the determined boundary is specified as the location of the object entrance.

8 Claims, 15 Drawing Sheets

(51) Int. Cl.
*G09B 29/00* (2006.01)
*G08G 1/0962* (2006.01)
*G08G 1/16* (2006.01)

(56) References Cited

U.S. PATENT DOCUMENTS

| | | | |
|---|---|---|---|
| 2001/0005810 A1* | 6/2001 | Senda et al. | 701/211 |
| 2004/0117111 A1* | 6/2004 | Tsurumi | 701/208 |
| 2005/0251332 A1* | 11/2005 | Entenmann | G09B 29/12 |
| | | | 701/532 |
| 2005/0268245 A1* | 12/2005 | Gipps | G06F 17/5004 |
| | | | 715/762 |
| 2007/0039729 A1* | 2/2007 | Watson | E21B 41/0064 |
| | | | 166/245 |
| 2007/0213927 A1* | 9/2007 | Ishigami | G01C 21/26 |
| | | | 701/417 |
| 2008/0169972 A1* | 7/2008 | Greenwood et al. | 342/174 |
| 2009/0210156 A1* | 8/2009 | Riley | G01S 19/05 |
| | | | 701/300 |
| 2010/0114474 A1* | 5/2010 | Suganuma | G01C 21/26 |
| | | | 701/532 |
| 2010/0324752 A1* | 12/2010 | Suganuma | B60W 40/06 |
| | | | 701/1 |
| 2012/0245902 A1* | 9/2012 | Li | G01C 21/32 |
| | | | 703/1 |

FOREIGN PATENT DOCUMENTS

| | | |
|---|---|---|
| JP | 2004-046746 A | 2/2004 |
| JP | 2005-106906 A | 4/2005 |
| JP | 2005-173681 A | 6/2005 |
| JP | 2006-349872 A | 12/2006 |
| JP | 2008-089606 A | 4/2008 |

OTHER PUBLICATIONS

Supreme Court, *Alice Corp.* Vs *CLS et al.*, Oct. 2013, pp. 1-23.*
International Search Report for PCT/JP2011/078567, Feb. 7, 2012.

* cited by examiner

TUNNEL ENTRANCE SPECIFICATION DEVICE AND METHOD THEREOF, COMPUTER PROGRAM FOR SPECIFYING TUNNEL ENTRANCE, AND RECORDING MEDIUM ON WHICH COMPUTER PROGRAM IS RECORDED

CROSS REFERENCE TO RELATED APPLICATIONS

This application is a continuation of International Application No. PCT/JP2011/078567 filed Dec. 9, 2011, which claims priority to Japanese patent application No. 2011-015567 filed Jan. 27, 2011, and to Japanese patent application No. 2011-036511 filed Feb. 23, 2011, the entire contents of which are incorporated herein by reference.

FIELD OF INVENTION

The present invention relates to a device and a method for specifying an elevation and a position of a tunnel entrance. Also, the present invention relates to a device and a method for specifying an elevation of a tunnel entrance connected to an elevated road.

BACKGROUND ART

Regarding the positional accuracy of map information provided by a topographic map on a scale of 1:25,000 issued by Geospatial Information Authority of Japan, it is said that the position may be erroneous by a dozen meters due to human error, measurement error, or the like. Also, it is known that road elevation is greatly influenced if the position of the tunnel entrance is off-point because, in general, a topographic elevation widely changes near the tunnel entrance. In other words, when the position of the tunnel entrance is accidentally recognized at a position slightly displaced toward the tunnel, the elevation at the slope of the mountain located above the tunnel is erroneously computed as the road elevation of the entrance.

When the above erroneous elevation is used, for example, the road gradient within the tunnel, which is computed by using the elevation, may generate such error.

Thus, in order to highly accurately estimate the road elevation, a vehicular road elevation estimating device is proposed (Patent Document 1). The vehicular road elevation estimating device computes a reliability of a surface elevation value that is computed from surface elevation data. Then, the vehicular road elevation estimating device executes a filtering process for weighing the data with higher reliability to estimate the road elevation of a value closer to an actual road elevation.

Please refer to Patent Documents 2 to 4 that disclose conventional techniques related to the present invention.

PRIOR ART REFERENCE

Patent Document

[Patent Document 1] JP-A-2004-037141
[Patent Document 2] JP-A-2005-173681
[Patent Document 3] JP-A-2005-106906
[Patent Document 4] JP-A-2008-089606

SUMMARY OF THE INVENTION

Problems to be Solved by the Invention

The present inventors have enthusiastically studied ways to more accurately and more practically specify the road elevation and position at the tunnel entrance, around which the topographic elevation widely changes.

The elevation data provided for the map information is computed based on mesh elevation data sets. In the present specification, the mesh elevation data sets indicate elevations of points on the map information, which points correspond to grid intersection points of a predetermined-size mesh. In other words, elevation data at an arbitrary point on the map is determined based on linear interpolation using the above mesh elevation data sets for four points surrounding the arbitrary point.

As a result, when the topography surface, the elevation of which is to be specified, is present along a surface formed by mesh elevation data sets of the above four points (or in other words, when the topography surface is present along a flat surface or an inclined surface having a certain gradient), it is expected that the elevation value obtained based on the mesh elevation data sets highly reliably corresponds to the elevation value on the topography surface.

However, the actual topography near the tunnel entrance is considerably different from the surface formed by the above mesh elevation data sets because the elevation widely changes around the tunnel entrance. When thus obtained surface is different from the topography, the reliability of the elevation value of the tunnel entrance point calculated based on the mesh elevation data sets may be very low.

Also, considering that the topography near the tunnel entrance has a flat part and a slope part, it is highly probable that the tunnel entrance is present at a boundary between the flat part and the slope part.

Means for Solving the Problems

The invention is made in view with the above problems, and thereby it is an objective of the present invention to provide a technique that is capable of more accurately and more practically specifying a tunnel entrance.

More specifically, the first aspect of the present invention is defined as followed.

A tunnel entrance specifying device comprising:
a target entrance selecting portion configured to select a target entrance, an elevation and/or a position of which is to be specified, from a map data storing portion;
a target road link assigning portion configured to assign a road link, which includes the target entrance, as a target road link, the road link being retrieved from the map data storing portion;
an elevation acquiring portion configured to acquire elevations for a predetermined region that includes the target entrance;
an on-link boundary point identifying portion configured to identify a boundary point between a flat part and a slope part on the target road link based on the acquired elevations; and
a target entrance elevation/position specifying portion configured to specify an elevation of the identified boundary point as the elevation of the target entrance, and/or configured to specify the identified boundary point as the position of the target entrance.

According to the first aspect of the tunnel entrance specifying device defined above, for the target entrance selected as an tunnel entrance, an elevation and/or a position of which is to be specified, a boundary point between a flat part and a slope part on a target road link that includes the target entrance is identified as an on-link boundary point, and an elevation of the on-link boundary point is specified as an elevation of the target entrance. Also, the on-link boundary point is specified as a position of the target entrance. Because it is highly probable that the tunnel entrance is present at the boundary between the flat part and the slope part on the target road link, it is possible to more accurately and more practically specify the elevation/position of the tunnel entrance if the elevation/position of the tunnel entrance is specified as above.

In the above, the flat part on the target road link is not limited to a part that is completely flat. For example, the flat part may be a segment or a region, which has a gradient value equal to or less than a predefined first gradient value (for example, 2%), on a gradient curved line, which is formed based on acquired elevation values.

Also, for example, the slope part on the target road link may be a segment or a region, which has a gradient value equal to or greater than a predefined second gradient value (for example, 10%), on the above gradient curved line.

Furthermore, the on-link boundary point is a boundary point between the flat part and the slope part on the target road link. For example, one straight line is formed by straight-line approximation of the gradient curved line that connects the elevation values for the segment of the above flat part. The other straight line is formed by straight-line approximation of the gradient curved line that connects the elevation values for the segment of the above slope part. An intersection point between the one straight line and the other straight line is identified as the on-link boundary point.

Also, as another example, the gradient values obtained from the acquired elevation values may be used in order to identify the on-link boundary point. A point, which has the maximum absolute value of the change in the gradient, may be identified as the on-link boundary point.

Also, the elevation acquiring portion may acquire the elevations based on mesh elevation data sets that indicate elevations of points on a map, which correspond to grid intersection points of a predetermined-size mesh (second aspect). The mesh elevation data sets are published by Geospatial Information Authority of Japan, and are available in a storage medium format (such as CD-ROM) similarly to navigation software. In the case of a national map, the mesh elevation data sets have highly defined sections of small square-shaped regions having about 50 m or 10 m on each side. An elevation of arbitrary point within the predetermined region of map data is usually obtained using a linear interpolation method on the elevations (mesh elevation data sets) at four grid intersection points that surround the arbitrary point.

Furthermore, in the tunnel entrance specifying device defined in the first or second aspects, the elevation acquiring portion may acquire elevations of arbitrary points on the target road link (third aspect).

As above, when the elevation acquiring portion acquires the elevations of the points within the above predetermined region and on the target road link, it is possible to reduce the load of a processing device in addition to the accurate and practical specification of the elevation/position of the target entrance.

The fourth aspect of the present invention is defined as follows. More specifically, in the tunnel entrance specifying device according to the first aspect or the second aspect, the on-link boundary point identifying portion defines a boundary line between a flat region formed by the flat part and a slope region formed by the slope part based on the acquired elevations, and the boundary point identifying portion identifies an intersection point between the boundary line and the target road link as an on-link boundary point.

According to the fourth aspect of the tunnel entrance specifying device defined above, because the topography near the target entrance is considered, it is possible to more accurately and more practically identify the on-link boundary point.

Due to the above configuration, in a general tunnel entrance (A or B in FIG. 6(A), also referred to as a general target entrance) that has therearound topography with the flat part and the slope part, it is possible to accurately and practically compute the road elevation of the tunnel entrance.

On the other hand, there is another type tunnel entrance (C or D in FIG. 6(B), also referred to as a special target entrance) that has therearound topography not constituted by the flat part and the slope part. For example, the above tunnel entrance is connected to an elevated road.

Thus, the fifth aspect of the present invention is defined as follows. More specifically, a tunnel entrance elevation specifying device includes:

a special target entrance selecting portion configured to select a tunnel entrance, which is connected to an elevated road, from a map data storing portion, the tunnel entrance serving as a special target entrance;

a special target road link assigning portion configured to assign a road link, which includes the special target entrance, as a special target road link, the road link being retrieved from the map data storing portion;

a trusted point identifying portion configured to identify first and second trusted points located on the special target road link, the first and second trusted points having the special target entrance located therebetween;

a first elevation calculating portion configured to calculate a first elevation corresponding to coordinates for the special target entrance based on the identified trusted points; and a special target entrance elevation specifying portion configured to specify the calculated first elevation as an elevation of the special target entrance.

In the fifth aspect of the tunnel entrance elevation specifying device defined above, for a selected special target entrance tunnel, which is connected to the elevated road, and an elevation of which is to be specified, first and second trusted points (E and F in FIG. 6(B)) on the special target road link having the special target entrance are identified. The first and second trusted points have the special target entrance located therebetween. A first elevation that corresponds to coordinates for the special target entrance is computed based on the trusted points. The first elevation is specified as the elevation of the special target entrance. As above, when the elevation of the tunnel entrance is specified based on the points, which have the special target entrance therebetween, and which have reliable elevations, it is possible to accurately and practically specify the elevation of the special target entrance connected to the elevated road.

In the above, the tunnel entrance connected to the elevated road, which entrance is selected as the special target entrance, may be a tunnel entrance having a topography, where an elevation of a road surface at an arbitrary point on the road extending outwardly from the tunnel entrance is different from an elevation of a ground surface at the arbitrary point. Examples of the above tunnel entrance include a tunnel entrance connected to an elevated road or a dam. Also, the above tunnel entrance is not limited to a tunnel entrance that is directly connected to a structure like an elevated road. However, the above tunnel entrance may be a tunnel entrance that is indirectly connected to the elevated road through a general road.

When it is determined that a tunnel entrance includes a slope segment but does not include a flat segment, for example, based on the elevations for a predetermined region having the special target entrance therein, the tunnel entrance is selected as the special target entrance. The above makes sense because the topography near the general tunnel entrance includes both the slope segment and the flat segment. Also, as another selecting method, when an elevation of a road surface at an arbitrary point on the road extending outwardly from the tunnel entrance is different from an elevation of a ground surface at the arbitrary point, the tunnel entrance may be selected as the special target entrance.

Also, the trusted point identifying portion acquires elevations for a predetermined region that includes an arbitrary point on the special target road link, and the trusted point identifying portion identifies a boundary point between a flat part and a slope part on the special target road link as the trusted point (sixth aspect).

The seventh aspect of the present invention is defined as follows. More specifically, the tunnel entrance elevation specifying device according to the fifth or sixth aspects further includes:

a validity determining portion configured to determine whether the calculated first elevation is valid; and a correcting portion configured to correct the first elevation when the validity determining portion determines that the first elevation is not valid.

According to the seventh aspect of the tunnel entrance elevation specifying device defined above, validity of the calculated first elevation is determined. By determining the validity, for example, the first elevation, which is determined as invalid, may be cancelled, or may be corrected to be valid. Also, by adding a flag indicating invalidity to the first elevation, it is possible to provide indexes for on-site investigation, for example.

In the above, the validity determining portion determines that the first elevation is not valid when a difference between the first elevation and an elevation associated with the first trusted point is equal to or greater than a first threshold value, and/or when a difference between the first elevation and an elevation associated with the second trusted point is equal to or greater than the first threshold value (eighth aspect).

Because the road near the tunnel entrance usually does not have a steep gradient structure for safety reasons, it is expected that the elevation difference between the first elevation and the elevation associated with the trusted point is small. Therefore, when the elevation difference is equal to or greater than the first threshold value, it may be determined that the first elevation is not valid.

Also, as another example, a second elevation of the special target entrance is computed based on mesh elevation data sets, and when the first elevation is significantly different from the second elevation, it may be determined that the calculated first elevation is not valid.

Thus, the tunnel entrance elevation specifying device of the present invention further includes a second elevation acquiring portion configured to acquire an elevation of the special target entrance as a second elevation based on mesh elevation data sets. In the above case, the validity determining portion determines that the first elevation is not valid when a difference between the first elevation and the second elevation is equal to or greater than a second threshold value (ninth aspect).

Furthermore, as another example, the validity determining portion may determine that the first elevation is not valid when the first trusted point and/or the second trusted point is a distance away from the special target entrance, the distance being equal to or greater than a third threshold value (tenth aspect).

In order to accurately and practically specify the elevation of the special target entrance, it is preferable that the trusted point is present in a region within the certain distance from the special target entrance.

EMBODIMENT CARRYING OUT THE INVENTION

A tunnel entrance specifying device according to an embodiment of the present invention will be described.

Figure 1:
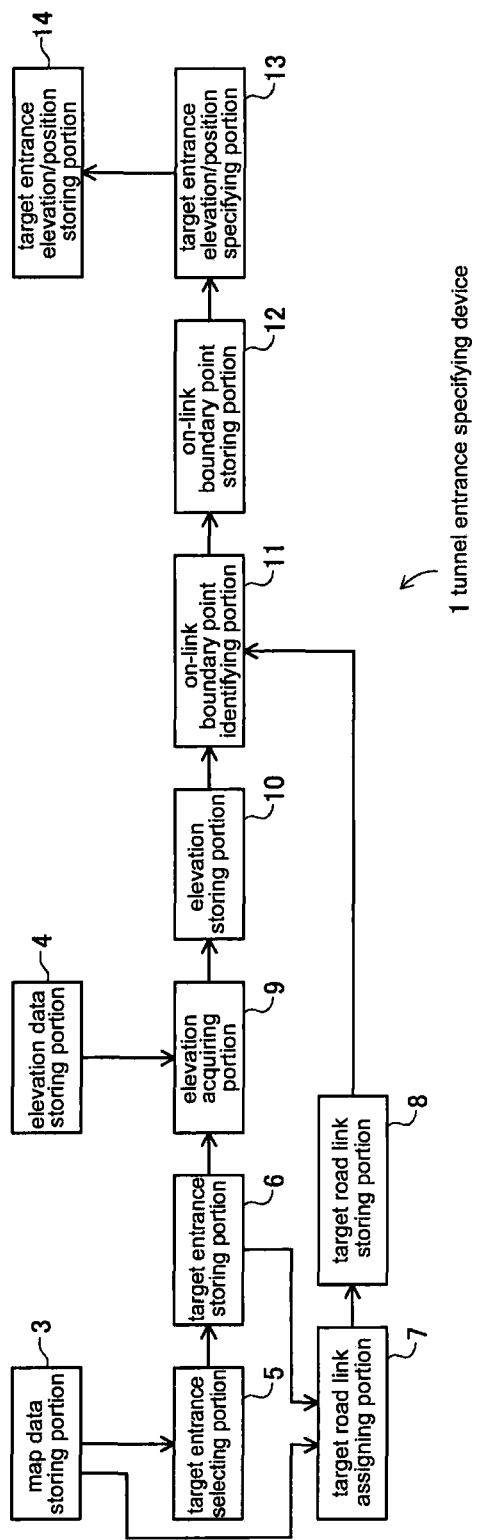
FIG. 1 is a block diagram illustrating a configuration of a tunnel entrance specifying device according to an embodiment of the present invention.

FIG. 1 illustrates a general configuration of a tunnel entrance specifying device 1 according to the embodiment of the present invention. Description will be made below based on a schematic diagram shown in FIG. 2, when necessary.

As shown in FIG. 1, the tunnel entrance specifying device 1 includes a map data storing portion 3, an elevation data storing portion 4, a target entrance selecting portion 5, a target entrance storing portion 6, a target road link assigning portion 7, a target road link storing portion 8, an elevation acquiring portion 9, an elevation storing portion 10, an on-link boundary point identifying portion 11, an on-link boundary point storing portion 12, a target entrance elevation/position specifying portion 13, and a target entrance elevation/position storing portion 14.

The map data storing portion 3 stores map information. The map information includes information related to road components (such as links, nodes) for defining map information, and also includes information drawn on the map.

The elevation data storing portion 4 stores elevation data sets that are associated with the map data. The elevation data sets may be prepared in advance. Furthermore, each of the elevation data sets may be preferably made for each region segmented by a predetermined-size mesh and may be associated with topographic elevation information. Examples of the above data sets may include mesh elevation data sets. The mesh elevation data sets are published by Geospatial Information Authority of Japan. In the case of a national map, the mesh elevation data sets have highly defined sections of small square-shaped regions having about 50 m or 10 m on each side. Each of the data sets has the elevation of a center position in the respective region.

Figure 2A:
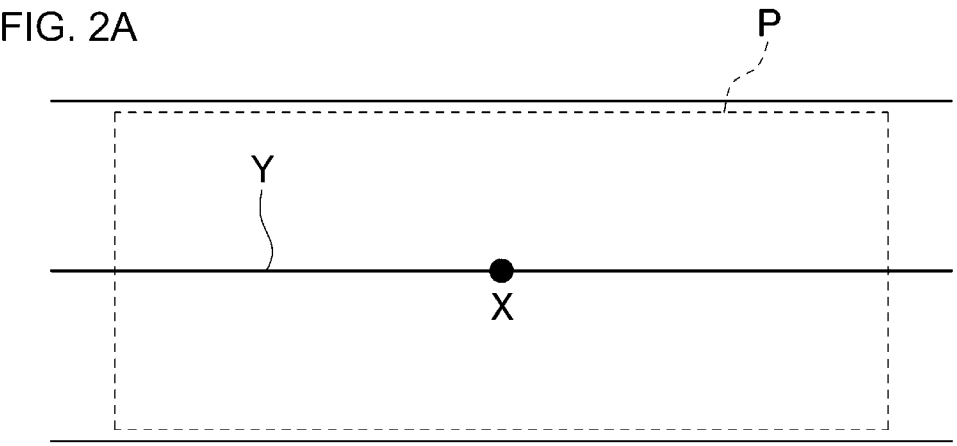
FIG. 2(A) is a schematic diagram for describing a method for acquiring an elevation executed by an elevation acquiring portion 9.

The target entrance selecting portion 5 refers to the map data storing portion 3, and selects a tunnel entrance, an elevation/position of which is to be specified, as a target entrance (point X in FIG. 2(A)). The selected target entrance is stored in the target entrance storing portion 6.

The target road link assigning portion 7 refers to the map data storing portion 3 and the target entrance storing portion 6, and assigns a road link closest to or including the target entrance (point X), which is selected by the target entrance selecting portion 5, as a target road link (link Y in FIG. 2(A)). The assigned target road link is stored in the target road link storing portion 8.

The elevation acquiring portion 9 refers to the target entrance storing portion 6 and the elevation data storing portion 4, and acquires the elevations for a predetermined region that includes the target entrance. For example, the elevation acquiring portion 9 is capable of acquiring the elevations (in m) for a 200-meters-square region that has the target entrance at the center thereof. Alternatively, the elevation acquiring portion 9 may acquire the elevations only for a region (region P in FIG. 2(A)) on the target road link within the 200-meters-square region in order to reduce a load for the processing device. The acquired elevations are associated with coordinates at the elevation and stored in the elevation storing portion 10.

The on-link boundary point identifying portion 11 refers to the elevation storing portion 10 and the target road link storing portion 8, and identifies a boundary point between a flat part and a slope part on the target road link based on the acquired elevations.

One example of a detailed configuration of the on-link boundary point identifying portion 11 will be described with reference to FIG. 3. Note that, $h_1$ to $h_{13}$ in FIG. 2(B) indicate elevation values for the region P acquired by the elevation acquiring portion 9.

The on-link boundary point identifying portion 11 includes a flat segment extracting portion 21, a slope segment extracting portion 22, a first straight line forming portion 23, a second straight line forming portion 24, and an intersection point identifying portion 25.

The flat segment extracting portion 21 extracts a flat segment that serves as the flat part based on the elevation values acquired by the elevation acquiring portion 9. In other words, the flat segment extracting portion 21 extracts a segment (indicated by $h_1$ to $h_4$ in FIG. 2(B)), which has a gradient value equal to or less than a first gradient value. For example, the flat segment extracting portion 21 may extract a segment having a gradient value equal to or less than the first gradient value (for example, 2%) based on a gradient curved line formed by connecting the elevation values $h_1$ to $h_{13}$.

The first straight line forming portion 23 refers to the flat segment extracting portion 21, and forms a first straight line (straight line R in the same drawing) in the extracted flat segment. Examples of a method of forming the first straight line include forming the line by drawing an approximate straight line for the elevation values $h_1$ to $h_4$ in the flat segment. Also, the first straight line may be alternatively made by a tangent line at the flat segment of the above gradient curved line.

The slope segment extracting portion 22 extracts a slope segment that serves as a slope part based on the elevation values acquired by the elevation acquiring portion 9. In other words, the slope segment extracting portion 22 extracts the segment (indicated by $h_7$ to $h_{12}$ in FIG. 2(B)), which a gradient value equal to or greater than a second gradient value. For example, the slope segment extracting portion 22 may extract the segment having a gradient value equal to or greater than the second gradient value (for example, 10%) based on the gradient curved line formed in a way similar to the above.

The second straight line forming portion 24 refers to the slope segment extracting portion 24, and forms a second straight line in the extracted slope segment (straight line S shown in the same drawing). A method of forming the second straight line includes, for example, forming the line by drawing an approximate straight line of elevation values $h_7$ to $h_{12}$ in the slope segment. Also, the second straight line may be alternatively formed by a tangent line at the slope segment of the above gradient curved line.

Figure 2B:
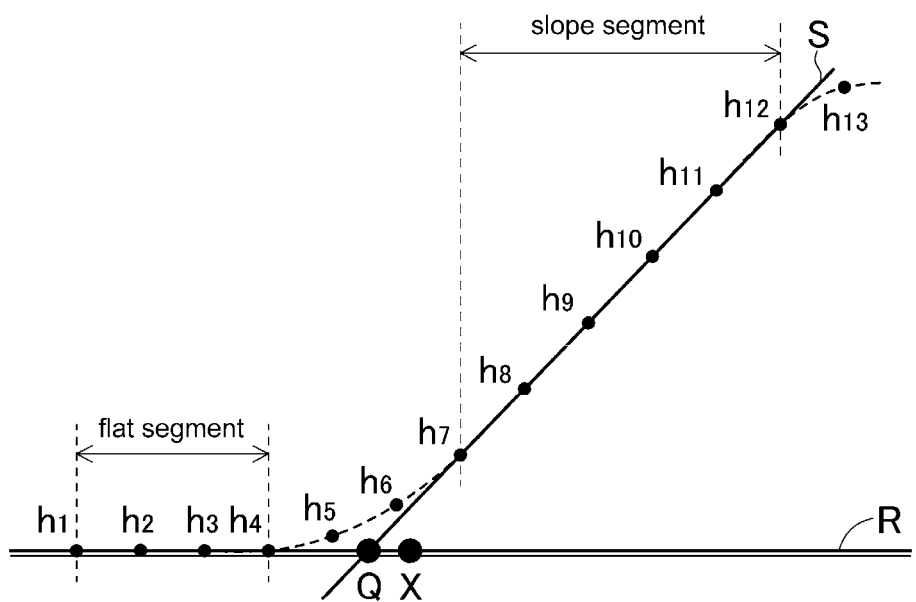
FIG. 2(B) is a schematic diagram for describing an identifying method executed by an on-link boundary point identifying portion 11 and a specifying method executed by a general elevation specifying portion 3511.
Figure 3:
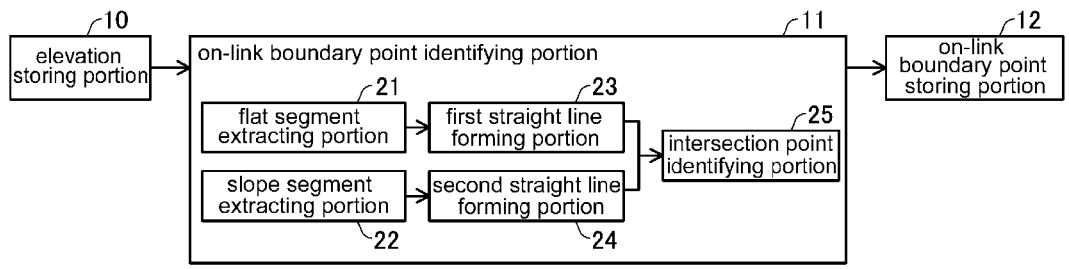
FIG. 3 is a block diagram illustrating a detailed configuration of the on-link boundary point identifying portion 11 according to the embodiment of the present invention.

The intersection point identifying portion 25 refers to the first straight line forming portion 23 and the second straight line forming portion 24, and identifies an intersection point (intersection point Q in FIG. 2(B)) between the formed first straight line (straight line R) and second straight line (straight line S).

The identified intersection point serves as a boundary point on a target road link between the flat segment and the slope segment, and is stored in the on-link boundary point storing portion 12 in association with the above target entrance.

As another example, the on-link boundary point identifying portion 11 may alternatively use gradient values obtained from the acquired elevation values in order to identify the on-link boundary point. The on-link boundary point identifying portion 11 may identify a point, which has the maximum absolute value of the change in the gradient, as the on-link boundary point.

Alternatively, when the elevation acquiring portion 9 acquires the elevations for the entirety of the predetermined region, a flat region serving as the flat part (more specifically, a region having a gradient value equal to or less than the first gradient value) may be extracted based on the elevation values, and a slope region serving as the slope part (more specifically, a region having a gradient value equal to or greater than the second gradient value) may be extracted based on the elevation values. Then, a boundary line is defined between the above regions, and the intersection point between the boundary line and the target road link may be identified as the on-link boundary point.

Referring back to FIG. 1, the target entrance elevation/position specifying portion 13 refers to the on-link boundary point storing portion 12, and specifies the elevation in the identified on-link boundary point as the elevation of the target entrance, and/or specifies the identified on-link boundary point as the position of the target entrance.

More specifically, the target entrance elevation/position specifying portion 13 specifies the intersection point Q, which is identified as the on-link boundary point, as the position of the target entrance.

Also, for example, a gradient curved line may be formed based on the elevation values $h_1$ to $h_{13}$, and an elevation value of the intersection point Q may be calculated as a value on the gradient curved line. The thus calculated value may be specified as the elevation of the target entrance. Also, the examples of a method of more highly accurately specifying the road elevation include specifying the elevation value obtained based on the elevation values $h_1$ to $h_4$ of the segment extracted as the flat part (for example, an average value of the elevation values $h_1$ to $h_4$) as the elevation value of the target entrance (intersection point Q). Because the road around the tunnel entrance is often flat, the elevation value of this flat part may be specified as the elevation of the target entrance. By doing the above, it is possible to more practically specify the elevation of the target entrance.

The specified target entrance elevation/position is stored in the target entrance elevation/position storing portion 14.

Figure 4:
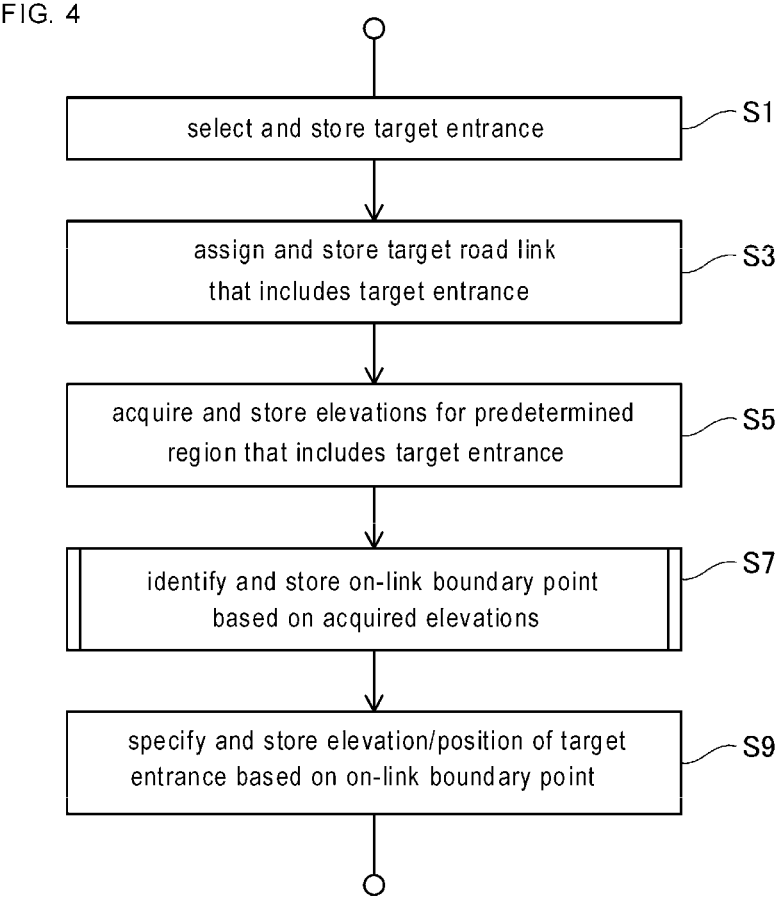
FIG. 4 is a flow chart illustrating the operation of the tunnel entrance specifying device according to the embodiment of the present invention.

Operation of the tunnel entrance specifying device 1 in FIG. 1 will be described with reference to FIG. 4.

Firstly, at step 1, control refers to the map data storing portion 3, and selects a tunnel entrance, the elevation/position of which is to be specified, as the target entrance. Then, control stores the target entrance.

At step 3, control refers to the map data storing portion 3 and the target entrance storing portion 6, and assigns a road link, which includes the target entrance selected at a step 1, as the target road link. Then, control stores the target road link.

Subsequently, control refers to the elevation data storing portion 4 and the target entrance storing portion 6, and acquires the elevations for the predetermined region that includes the target entrance selected at step 1. Then, control stores the elevations in association with the coordinates at the respective elevations (step 5). Examples of the acquisition of the elevations for the predetermined region include acquisition of the elevations (in m) for a 200-meters-square region having the target entrance at the center thereof. Also, control may alternatively acquire the elevations only for a region (region P in FIG. 2(A)) on the target road link in the predetermined region because the above is capable of reducing the load of the processing device.

At step 7, control refers to the elevation storing portion 10 and the target road link storing portion 8, and identifies the boundary point between the flat part and the slope part on the target road link based on the acquired elevations. Then, control stores the boundary point.

Figure 5:
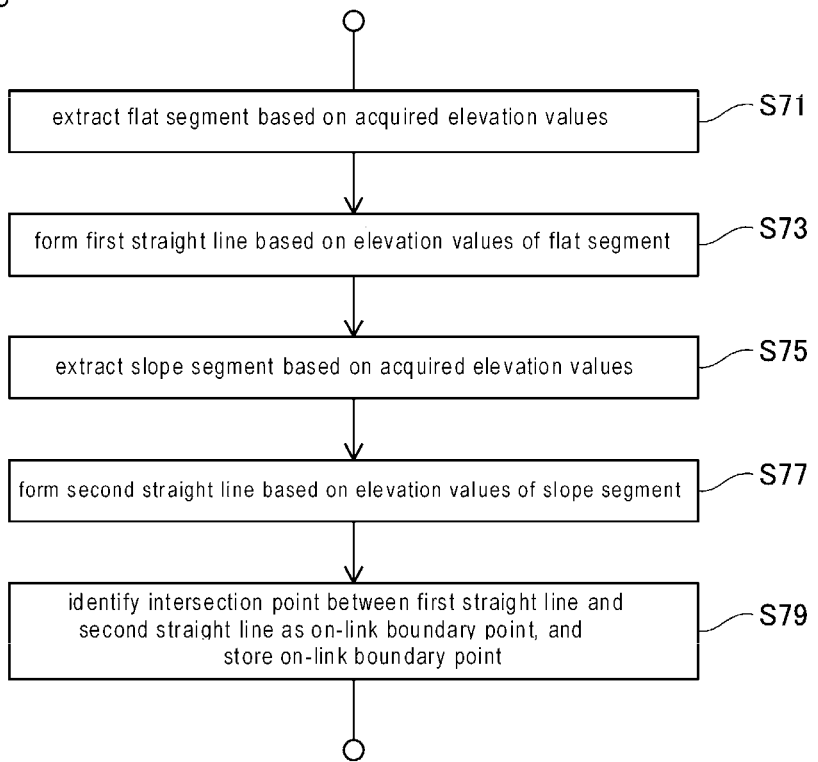
FIG. 5 is a flow chart illustrating the detailed operation of step 7 according to the embodiment of the present invention.

One example of a detailed operation in step 7 will be described with reference to FIG. 5.

At step 71, control refers to the elevation storing portion 10, and extracts the flat segment serving as the flat part based on the acquired elevation values. Examples of the method of extracting the flat segment include extracting the segment, which has a gradient value equal to or less than the first gradient value, by using the gradient curved line formed based on the elevation values $h_1$ to $h_{13}$ in FIG. 2(B). Subsequently, control forms the first straight line (straight line R in FIG. 2(B)) representing the extracted flat segment (step 73). Examples of the method of forming the first straight line include forming the line by drawing the approximate straight line for the elevation values $h_1$ to $h_4$ in the flat segment. Also, the first straight line may be alternatively made by a tangent line at the flat segment of the above gradient curved line.

At step 75, control refers to the elevation storing portion 10, and extracts the slope segment serving as the slope part based on the acquired elevation values. Examples of the method of extracting the slope segment include extracting the segment, which has a gradient value equal to or greater than the second gradient value, by using the gradient curved line formed based on the elevation values $h_1$ to $h_{13}$ in FIG. 2(B). Subsequently, control forms the second straight line (straight line S in FIG. 2(B)) representing the extracted slope segment (step 77). Examples of the method of forming the second straight line include forming the line by drawing the approximate straight line for the elevation values $h_7$ to $h_{12}$ in the slope segment. Also, the second straight line may be alternatively made by a tangent line at the slope segment of the above gradient curved line.

Control identifies the intersection point (intersection point Q) between the first straight line (straight line R) formed at step 73 and the second straight line (straight line S) formed at step 77 as the boundary point between the flat segment and the slope segment on the target road link, and stores the intersection point (step 79).

Referring back to FIG. 4, at step 9, the target entrance elevation/position specifying portion 13 refers to the on-link boundary point storing portion 12, and specifies the elevation/position of the target entrance based on the on-link boundary point identified at step 7. Then, control stores the elevation/position. More specifically, control specifies the position of the on-link boundary point as the position of the target entrance. Also, control specifies the elevation of the on-link boundary point (for example, the elevation of the on-link boundary point calculated as the value on the gradient curved line) as the elevation of the target entrance. As another example, the elevation value of the above flat segment (for example, the average value of the elevation values in the flat segment) may be specified as the elevation of the target entrance. Because the road around the tunnel entrance is often flat, the elevation value of this flat part may be specified as the elevation of the target entrance. By doing the above, it is possible to more practically specify the elevation of the target entrance.

Next, there will be described a tunnel entrance elevation specifying device that is capable of accurately and practically specifying the elevation of the tunnel entrance connected to an elevated road. In the description of the tunnel entrance elevation specifying device, firstly, there will be described below one example of selecting a tunnel entrance, which is connected with the elevated road, among the tunnel entrances in the map data. More specifically, there will be described one example of classifying whether or not the tunnel entrance is connected with the elevated road. Note that, in the description below, a tunnel entrance connected to the elevated road, which entrance is to be specified by the tunnel entrance elevation specifying device of the present invention, is named as a "special target entrance", and a tunnel entrance other than the special target entrance is named as a "general target entrance".

Also, please refer to the above for the details of the technical description of this point, when necessary.

Figure 7:
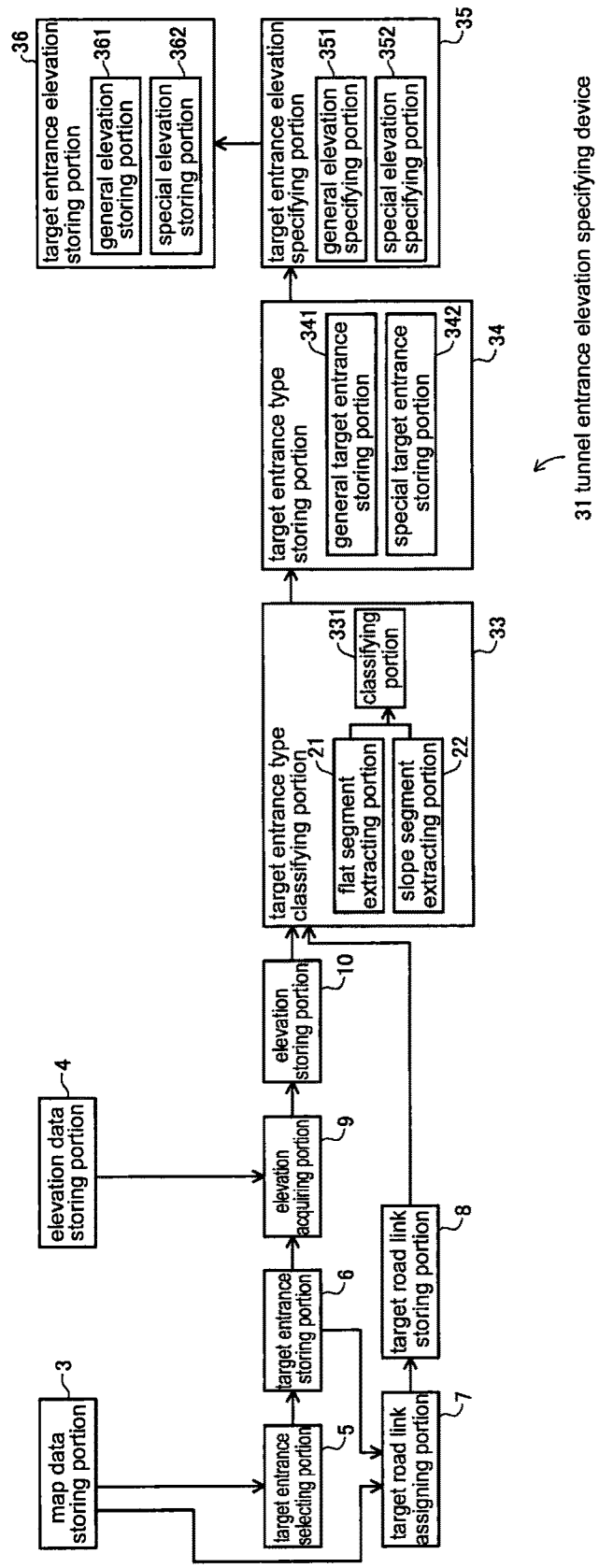
FIG. 7 is a block diagram illustrating a configuration of the tunnel entrance specifying device as one example of a special target entrance selecting portion according to another embodiment of the present invention.

FIG. 7 illustrates a general configuration of the tunnel entrance elevation specifying device 31. Components in FIG. 7 similar to those in FIG. 1 and FIG. 3 are indicated by the same numeral, and the description of the components is partially omitted. Also, the description below will be made with the schematic diagrams illustrated in FIGS. 2(A) and 2(B) when necessary.

As shown in FIG. 7, the tunnel entrance elevation specifying device 31 includes the map data storing portion 3, the elevation data storing portion 4, the target entrance selecting portion 5, the target entrance storing portion 6, the target road link assigning portion 7, the target road link storing portion 8, the elevation acquiring portion 9, the elevation storing portion 10, a target entrance type classifying portion 33, a target entrance type storing portion 34, a target entrance elevation specifying portion 35, and a target entrance elevation storing portion 36.

In the device 31, the target entrance selecting portion 5 refers to the map data storing portion 3, and selects a tunnel entrance, the elevation of which is to be specified, as the target entrance (point X in FIG. 2(A)).

The target entrance type classifying portion 33 includes the flat segment extracting portion 21, the slope segment extracting portion 22, and a classifying portion 331. The target entrance type classifying portion 33 classifies the target entrance selected by the target entrance selecting portion 5 into the general target entrance and the special target entrance based on the elevation storing portion 10 and the target road link storing portion 8.

The classifying portion 331 refers to the results, which are extracted by the flat segment extracting portion 21 and the slope segment extracting portion 22 based on the elevations of a predetermined region acquired by the elevation acquiring portion 9. And the classifying portion 331 classifies the above target entrance into the general target entrance and the special target entrance. In other words, when the predetermined region includes both the flat segment and the slope segment therein, the target entrance is classified into the general target entrance. On the other hand, when the predetermined region does not include the flat segment, the target entrance is classified into the special target entrance.

The classified type of the target entrance is associated with the flat segment information and/or the slope segment information, and is respectively stored in a general target entrance storing portion 341 or in a special target entrance storing portion 342 within the target entrance type storing portion 34.

The target entrance elevation specifying portion 35 includes a general target entrance elevation specifying portion 351 and a special target entrance elevation specifying portion 352, and specifies the elevation of the entrance for each of the above target entrance types.

Figure 8:
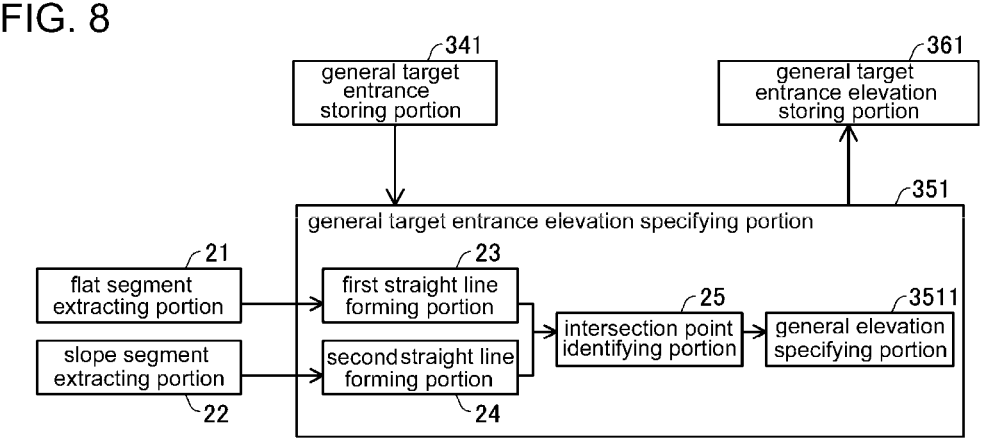
FIG. 8 is a block diagram illustrating a detailed configuration of a general target entrance elevation specifying portion 351.

One example of a detailed configuration of the general target entrance elevation specifying portion 351 will be described with reference to FIG. 8. Components in FIG. 8 similar to those in FIG. 1, FIG. 3, and FIG. 7 will be indicated by the same numerals, and the description of the components will be partially omitted.

The general target entrance elevation specifying portion 351 includes the first straight line forming portion 23, the second straight line forming portion 24, the intersection point identifying portion 25, and a general elevation specifying portion 3511, and refers to a general target entrance type storing portion 341, the flat segment extracting portion 21, and the slope segment extracting portion 22 in order to specify the elevation of the stored general target entrance.

The intersection point identifying portion 25 refers to the first straight line forming portion 23 and the second straight line forming portion 24, and identifies the intersection point (intersection point Q in FIG. 2(B)) of the formed first straight line (straight line R) and the formed second straight line (straight line S). The identified intersection point corresponds to the boundary point between the flat segment and the slope segment on the target road link, and it is highly probable that the boundary point has the above general target entrance present thereon.

As another example, the intersection point identifying portion 25 may alternatively use gradient values obtained from the acquired elevation values in order to identify the intersection point. The intersection point identifying portion 25 may identify a point, which has the maximum absolute value of the change in the gradient, as the intersection point.

Alternatively, when the elevation acquiring portion 9 acquires the elevations for the entirety of the predetermined region, a flat region serving as the flat part (more specifically, a region having a gradient value equal to or less than the first gradient value) may be extracted based on the elevation values, and a slope region serving as the slope part (more specifically, a region having a gradient value equal to or greater than the second gradient value) may be extracted based on the elevation values. Then, a boundary line is defined between the above regions, and the intersection point between the boundary line and the target road link may be identified as the on-link boundary point.

The general elevation specifying portion 3511 refers to the intersection point identifying portion 25, and specifies the elevation of the identified intersection point as the elevation of the general target entrance.

More specifically, the general elevation specifying portion 3511 may specify, for example, the elevation value of the intersection point Q, which is calculated as a value on a gradient curved line formed based on the elevation values $h_1$ to $h_{13}$, as the elevation of the target entrance. Also, the examples of a method of more highly accurately specifying the road elevation include specifying the elevation value, which is obtained based on the elevation values $h_1$ to $h_4$ of the segment extracted as the flat part (for example, an average value of the elevation values $h_1$ to $h_4$), as the elevation value of the target entrance (intersection point Q). Because the road around the tunnel entrance is often flat, the elevation value of this flat part may be specified as the elevation of the target entrance. By doing the above, it is possible to more practically specify the elevation of the target entrance.

The specified general target entrance elevation is stored in a general target entrance elevation storing portion 361 of the target entrance storing portion 36.

Figure 9:
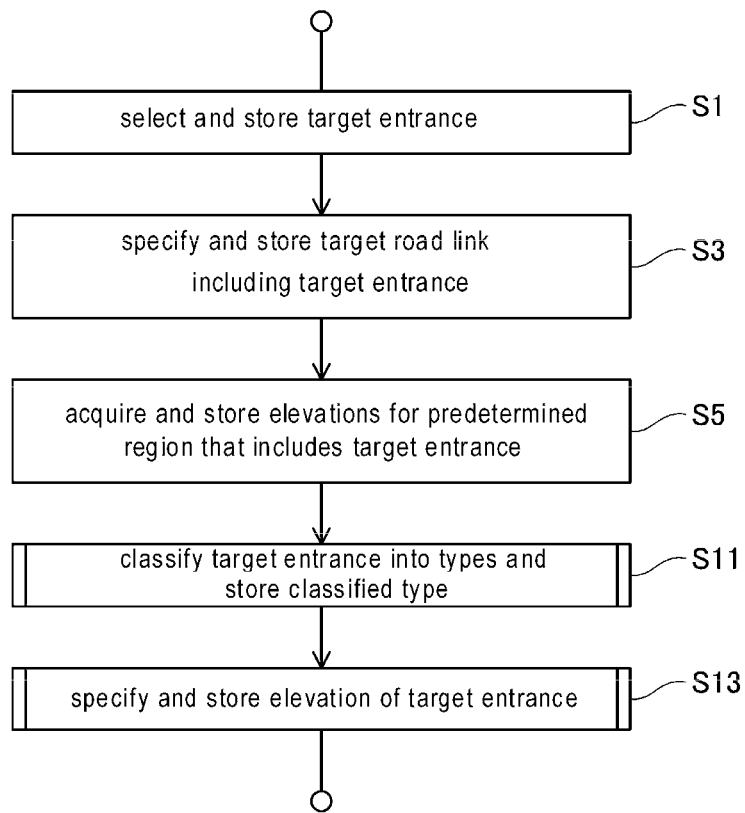
FIG. 9 is a flow chart illustrating the operation of the tunnel entrance specifying device as one example of the special target entrance selecting portion according to the other embodiment of the present invention.

Operation of the tunnel entrance elevation specifying device 31 shown in FIG. 7 will be described with reference to FIG. 9. Steps in FIG. 9 similar to those in FIG. 4 and FIG. 5 will be indicated with the same numerals, and the description of the steps will be partially omitted.

At step 11, control refers to the elevation storing portion 10 and the target road link storing portion 8, and classifies the target entrances into types based on the acquired elevations. Then, control stores the classified type.

At step 13, control specifies the elevation of the entrance for the respective target entrance type stored in the target entrance type storing portion 34, and stores the elevation of the entrance.

Figure 10:
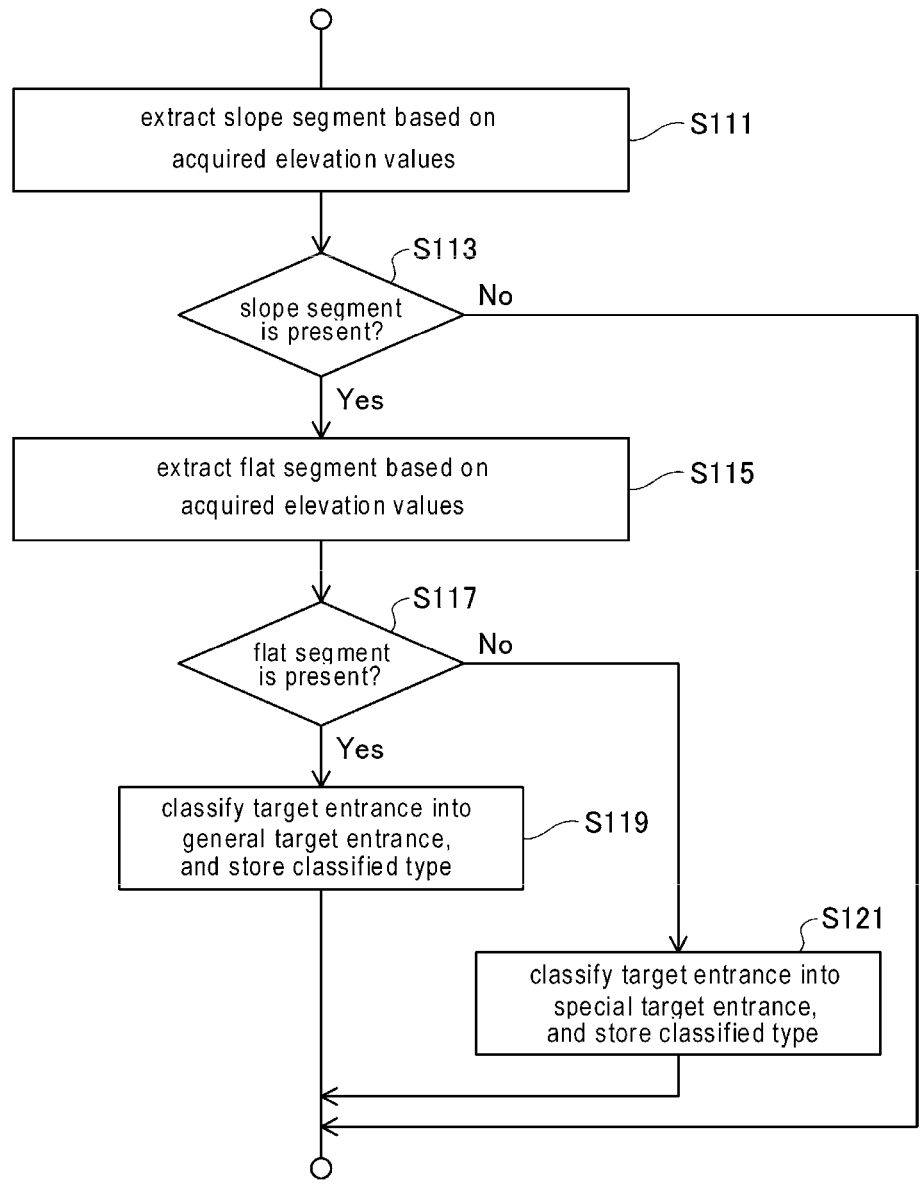
FIG. 10 is a flow chart illustrating the detailed operation in step 11.

One example of a detailed operation in step 11 will be described with reference to FIG. 10.

At step 111, control refers to the elevation storing portion 10, and extracts the slope segment serving as the slope part based on the acquired elevation values. Examples of the method of extracting the slope segment include extracting the segment having a gradient value equal to or greater than the second gradient value by using the gradient curved line formed based on the elevation values $h_1$ to $h_{13}$ in FIG. 2(B).

At step 113, control determines whether or not the slope segment has been extracted at step 111. When the slope segment is present (Yes at step 113), control proceeds to step 115.

At step 115, control refers to the elevation storing portion 10, and extracts the flat segment serving as the flat part based on the acquired elevation values. Examples of the method of extracting the flat segment include extracting the segment having a gradient value equal to or less than the first gradient value by using the gradient curved line formed based on the elevation values $h_1$ to $h_{13}$ in FIG. 2(B).

At step 117, control determines whether or not the flat segment has been extracted at step 115. When the flat segment is present (Yes at step 117), control classifies the target entrance into the general target entrance, and stores the target entrance in the general target entrance storing portion 341 in association with the slope segment information extracted at step 111 and with the flat segment information extracted step 115 (step 119). On the other hand, when the flat segment is absent (No at step 117), control classifies the target entrance into the special target entrance, and stores the target entrance in the special target entrance storing portion 342 (step 121).

Figure 11:
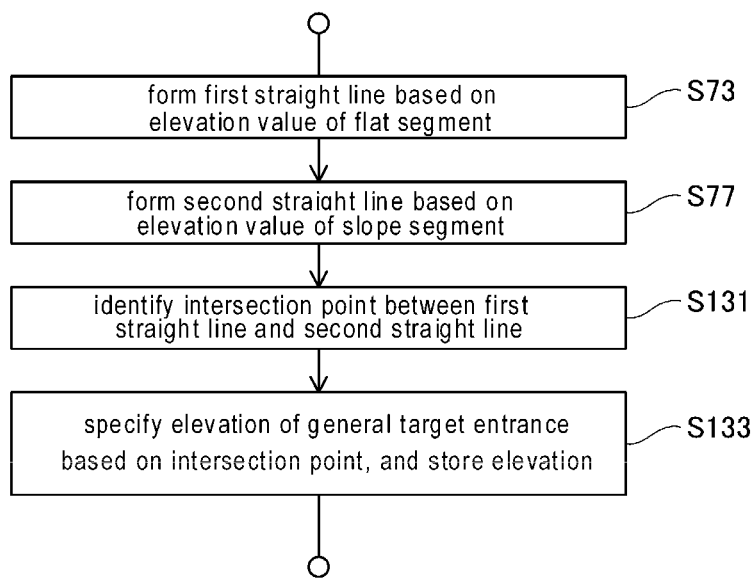
FIG. 11 is a flow chart illustrating the detailed operation in step 13.

One example of a detailed operation at step 13 for specifying the elevation of the general target entrance classified at step 119 will be described with reference to FIG. 11. Steps in FIG. 11 similar to those in FIG. 5 will be indicated with the same numerals, and the description of the steps will be partially omitted.

At step 131, the intersection point identifying portion 25 identifies the intersection point (intersection point Q) between the first straight line (straight line R) formed at step 73 and the second straight line (straight line S) formed at step 77 as an intersection point (boundary point) between the flat segment and the slope segment on the target road link (step 131).

At step 133, the general elevation specifying portion 3511 specifies the elevation of the general target entrance based on the intersection point identified at step 131, and stores the elevation. More specifically, the general elevation specifying portion 3511 specifies the position of the intersection point as the position of the general target entrance, and specifies the elevation of the intersection point (for example, the elevation of the intersection point calculated as the value on the gradient curved line) as the elevation of the general target entrance. As another example, the elevation value of the above flat segment (for example, the average value of the elevation values in the flat segment) may be specified as the elevation of the general target entrance. Because the road around the tunnel entrance is often flat, the elevation value of this flat part may be specified as the elevation of the target entrance. By doing the above, it is possible to more practically specify the elevation of the target entrance.

The tunnel entrance elevation specifying device according to the present invention is capable of accurately and practically specifying the elevation of the tunnel entrance that is classified into the special target entrance. Note that, in the description below, the tunnel entrance elevation specifying device according to the present invention is referred to as a special target entrance elevation specifying device.

Figure 12:
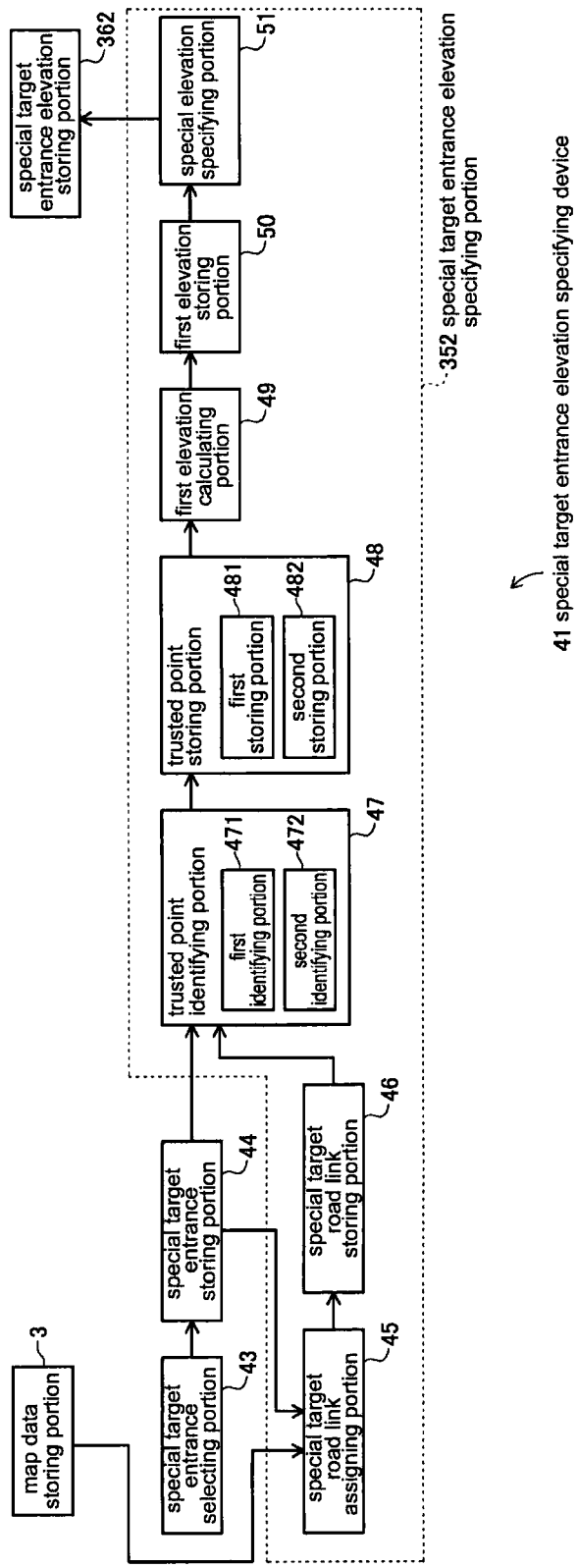
FIG. 12 is a block diagram illustrating a configuration of a special target entrance elevation specifying device according to yet another embodiment of the present invention.

FIG. 12 is a function block diagram of a special target entrance elevation specifying device 41 according to an embodiment of the present invention. Components in FIG. 12 similar to those in FIG. 1, FIG. 3, FIG. 7, and FIG. 8 will be indicated with the same numerals, and the description of the components will be partially omitted.

Also, the configuration illustrated by the numerals 45 through 51 functions as the special target entrance elevation specifying portion 352 shown in FIG. 7.

The special target entrance elevation specifying device 41 includes the map data storing portion 3, a special target entrance selecting portion 43, a special target entrance storing portion 44, a special target road link assigning portion 45, a special target road link storing portion 46, a trusted point identifying portion 47, a trusted point storing portion 48, a first elevation calculating portion 49, a first elevation storing portion 50, a special elevation specifying portion 51, and a special target entrance elevation storing portion 362.

Figure 6A:
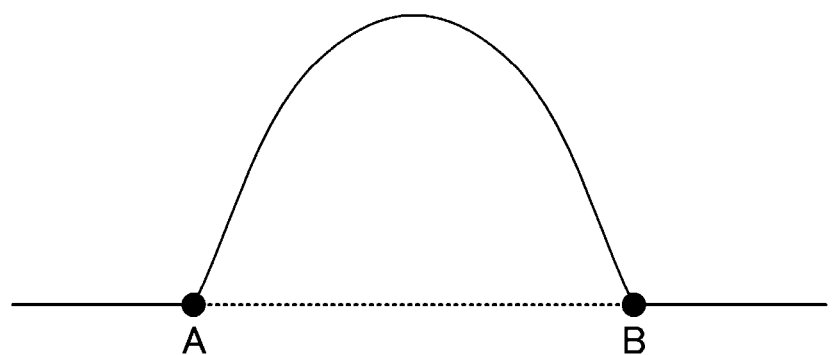
FIG. 6(A) is a schematic diagram illustrating one example of a general target entrance.
Figure 6B:
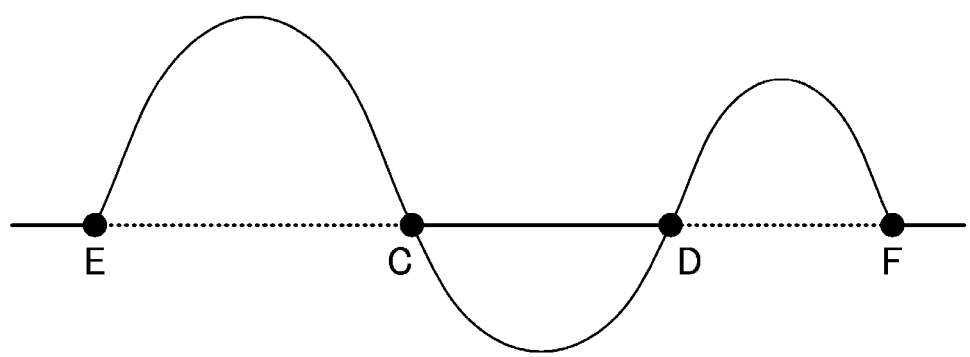
FIG. 6(B) is a schematic diagram illustrating one example of the special target entrance.

The special target entrance selecting portion 43 selects the tunnel entrance connected with the elevated road, the elevation of which entrance is to be specified, as the special target entrance (C or D in FIG. 6(B)). The special target entrance is selected, for example, in a similar manner as executed by the target entrance type classifying portion 33 of the tunnel entrance elevation specifying device 31. More specifically, when it is determined that the target entrance includes the slope segment but does not include the flat segment based on the elevations for the predetermined region that includes the target entrance, the target entrance is selected as the special target entrance.

Alternatively, as another selecting method, when the elevation of a road surface at an arbitrary point on the road extending outwardly from the target entrance is different from the elevation of a ground surface at the arbitrary point, the target entrance may be selected as the special target entrance. The selected special target entrance is stored in the special target entrance storing portion 44.

The special target road link assigning portion 45 refers to the map data storing portion 3 and the special target entrance storing portion 44, and assigns, as the special target road link, a road link that includes or is closest to the target entrance selected by the special target entrance selecting portion 43. The assigned special target road link is stored in the special target road link storing portion 46.

A trusted point identifying portion 27 includes a first trusted point identifying portion 471 and a second trusted point identifying portion 472. The trusted point identifying portion 27 respectively identifies first and second trusted points (E and F in FIG. 6(B)) located on the special target road link, the first and second trusted points having therebetween the special target entrance selected by the special target entrance selecting portion 43. The identified trusted points are stored respectively in a first trusted point storing portion 481 and a second trusted point storing portion 482 of the trusted point storing portion 48 in association with the respective elevations.

In the present specification, the trusted point indicates a point having a highly reliable elevation value, and the point has the elevation associated with the coordinates. Examples of the trusted points include the general target entrance. More specifically, the trusted point identifying portion 47 may respectively identify two general target entrances located on the special target road link and close to the special target entrance as the first trusted point and the second trusted point.

Also, the trusted point may be an arbitrary point within the flat segment.

The first elevation calculating portion 49 refers to the trusted point storing portion 48, and calculates a first elevation of the special target entrance. The calculation method is not limited to any method provided that the method is capable of accurately and practically calculating the first elevation. The first elevation may be calculated, for example, by using linear interpolation on the elevation values associated with the identified first and second trusted points. The calculated first elevation is stored in the first elevation storing portion 50 in association with the special target entrance.

The special elevation specifying portion 51 specifies the first elevation calculated by the first elevation calculating portion 49 as the elevation of the special target entrance. The specified elevation is stored in the special target entrance elevation storing portion 362 in association with the special target entrance.

Figure 13:
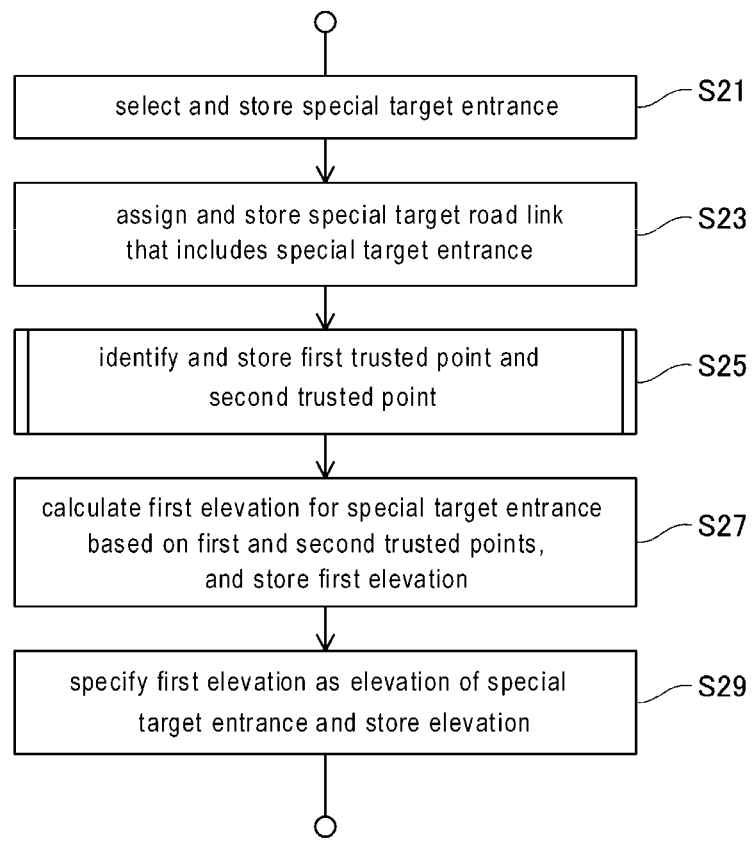
FIG. 13 is a flow chart illustrating the operation of the special target entrance elevation specifying device according to the yet another embodiment of the present invention.

Operation of the special target entrance elevation specifying device 41 shown in FIG. 12 will be described with reference to FIG. 13.

Firstly, at step 21, control selects the tunnel entrance connected with the elevated road, the elevation of which entrance is to be specified, as the special target entrance, and stores the tunnel entrance. For example, the special target entrance is selected through a method at steps 1 to 5, 11, and 13 in FIG. 9 and at steps 111 to 121 in FIG. 6. Then, the target entrance classified at step 121 is selected as the special target entrance.

Referring back to FIG. 13, at step 23, control refers to the map data storing portion 3 and the special target entrance storing portion 44, and assigns a road link including the special target entrance, which is selected at step 21, as the target road link. Then, control stores the target road link.

Subsequently, at step 25, the trusted point identifying portion 47 refers to the special target entrance storing portion 44 and the special target road link storing portion 46, and respectively identifies the first trusted point and the second trusted point, which are located on the special target road link, and which have the special target entrance therebetween. Then, control stores the first and second trusted points in association with the elevation values. Examples of the above trusted points include the general target entrance. More specifically, at step 25, the trusted point identifying portion 47 may identify two general target entrances, which are located on the special target road link and close to the special target entrance, respectively as the first trusted point and the second trusted point. Alternatively, the trusted point may be an arbitrary point within the flat segment.

Figure 14:
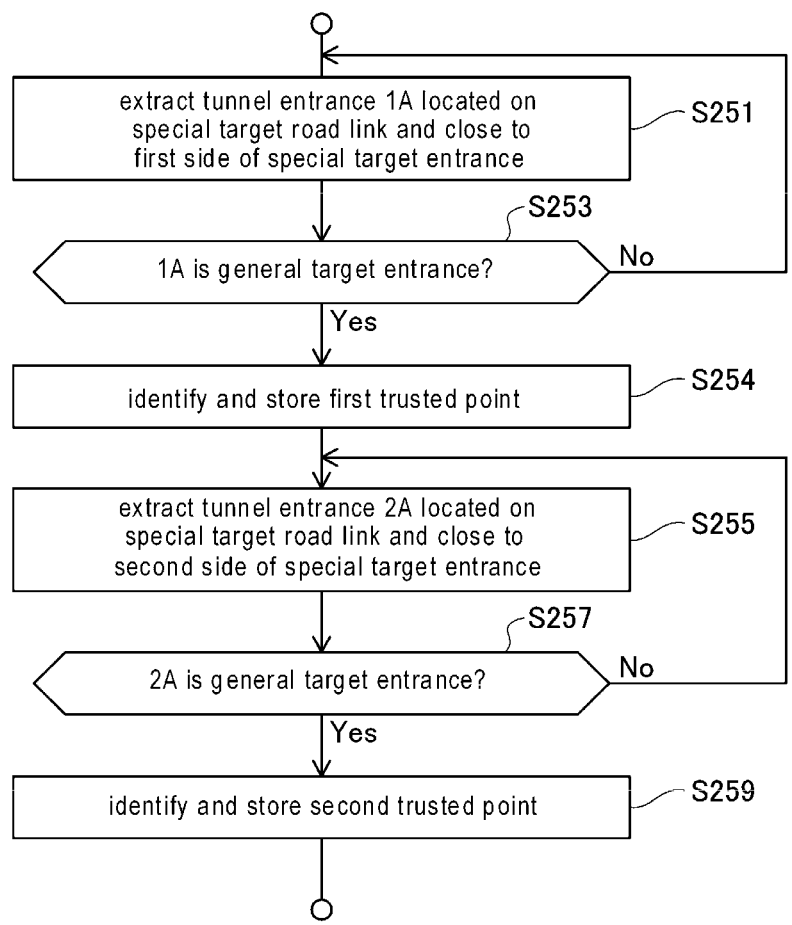
FIG. 14 is a flow chart illustrating the detailed operation in step 25 of the yet another embodiment of the present invention.

One example of a detailed operation in step 25 will be described with reference to FIG. 14.

Firstly, at step 251, control refers to the special target entrance storing portion 44 and the special target road link storing portion 46, and extracts a tunnel entrance 1A, which is located on the special target road link and close to a first side of the special target entrance.

At step 253, control determines whether or not the tunnel entrance 1A extracted at step 251 is the general target entrance.

When the extracted tunnel entrance 1A is the general target entrance (Yes at step 253), the first trusted point identifying portion 471 identifies the tunnel entrance 1A as the first trusted point. Then, the coordinates and the elevation of the tunnel entrance 1A are associated with each other, and are stored in the first trusted point storing portion 481 (step 254).

When the extracted tunnel entrance 1A is not the general target entrance (No at step 253), control goes back to step 251, where the first trusted point identifying portion 471 extracts another tunnel entrance that is located next closest to the first side.

Next, at step 255, control refers to the special target entrance storing portion 44 and the special target road link storing portion 46, and extracts a tunnel entrance 2A, which is located on the special target road link and close to a second side of the special target entrance.

At step 257, control determines whether or not the tunnel entrance 2A extracted at step 255 is the general target entrance.

When the extracted tunnel entrance 2A is the general target entrance (Yes at step 257), the second trusted point identifying portion 472 identifies the tunnel entrance 2A as the second trusted point. Then, the second trusted point is associated with the coordinates and the elevation of the tunnel entrance 2A, and is stored in the second trusted point storing portion 482.

When the extracted tunnel entrance 2A is not the general target entrance (No at step 257), control goes back to step 255, where the second trusted point identifying portion 472 extracts another tunnel entrance that is located next closest to the second side.

Referring back to FIG. 13, at step 27, the first elevation calculating portion 49 refers to the trusted point storing portion 48, and calculates the first elevation of the special target entrance based on the stored first and second trusted points. Then, the first elevation is stored. The calculation method is not limited to any specific method provided that the method is capable of accurately and practically calculating the first elevation. The first elevation may be calculated, for example, by using linear interpolation on the identified first and second trusted points.

At step 29, the special elevation specifying portion 51 specifies the first elevation obtained at step 27 as the elevation of the special target entrance, and the elevation is stored.

Figure 15:
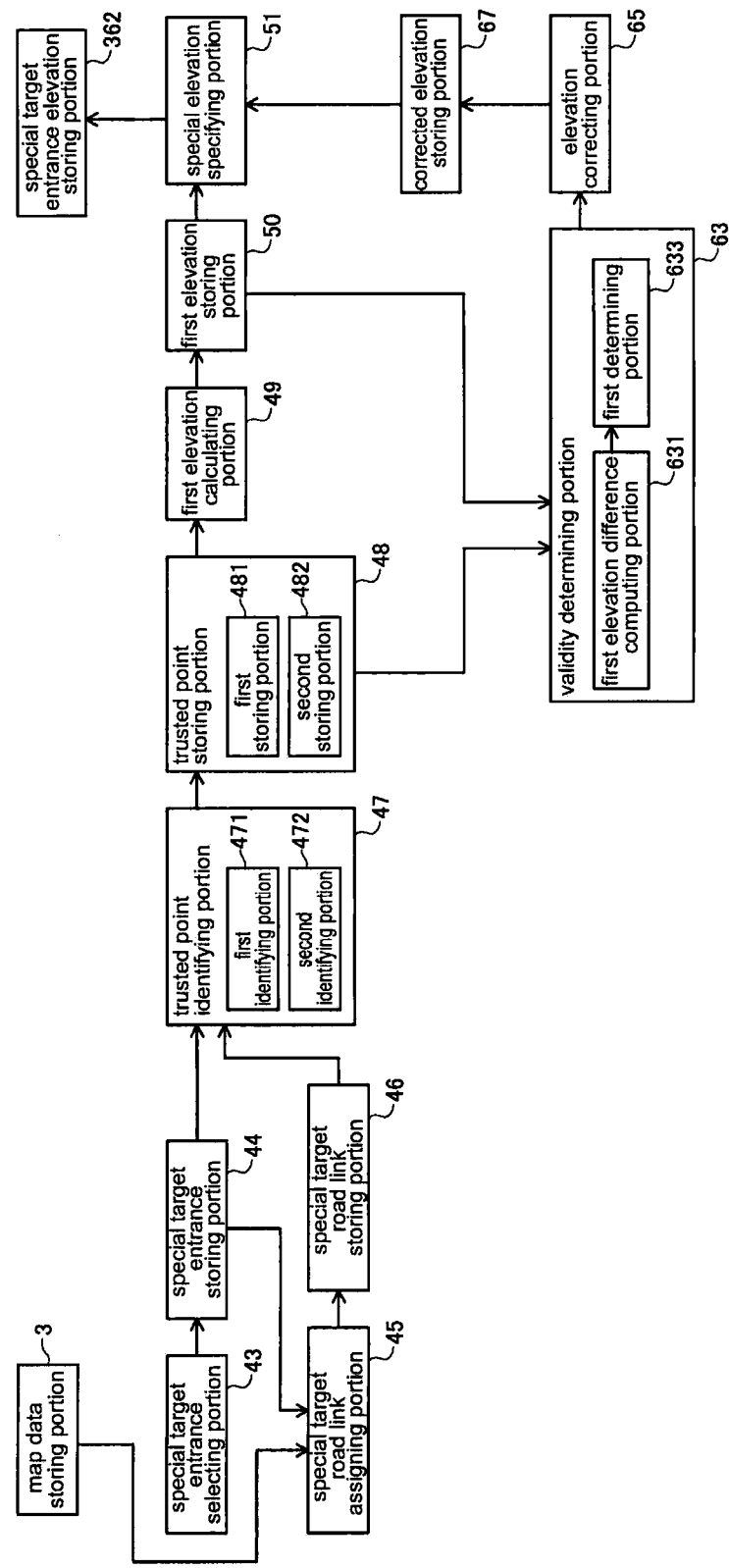
FIG. 15 is a block diagram illustrating a configuration of a special target entrance elevation specifying device according to further another embodiment of the present invention.

FIG. 15 illustrates a special target entrance elevation specifying device 61 according to further another embodiment. Components in FIG. 15 similar to those in FIG. 1, FIG. 3, FIG. 7, FIG. 8, and FIG. 12 will be indicated with the same numerals, and the description of the components will be partially omitted.

The special target entrance elevation specifying device 61 illustrated in FIG. 15 further includes a validity determining portion 63, an elevation correcting portion 65, and a corrected elevation storing portion 67 in addition to the components of the special target entrance elevation specifying device 41 in FIG. 12.

The validity determining portion 63 includes a first elevation difference computing portion 631 and a first determining portion 633, and refers to the trusted point storing portion 48 and the first elevation storing portion 50 to determine whether the first elevation is valid or not.

The first elevation difference computing portion 631 computes a difference (first elevation difference) between the first elevation stored in the first elevation storing portion 50 and the elevation associated with the first trusted point stored in the first trusted point storing portion 481 (or alternatively, the elevation associated with the second trusted point stored in the second trusted point storing portion 482).

The first determining portion 633 determines that the first elevation is not valid when the first elevation difference is equal to or greater than a predefined first threshold value. On the other hand, the first determining portion 633 determines that the first elevation is valid when the first elevation difference is less than the first threshold value.

Also, in order to more accurately determine the validity of the first elevation, the difference between the first elevation and the elevation associated with the first trusted point and the difference between the first elevation and the elevation associated with the second trusted point may both be computed. When both of the elevation differences are less than the first threshold value, it may be alternatively determined that the first elevation is valid.

As another example, the validity determining portion 63 may compute a gradient between the first elevation and the elevation of the first trusted point. When the gradient is equal to or greater than a predefined gradient value (for example, 2%), it may be determined that the first elevation is not valid.

The elevation correcting portion 65 corrects the first elevation that is determined as invalid by the validity determining portion 63. The correcting method is not limited to any specific method provided that the method is capable of correcting the first elevation such that the first elevation falls within a valid range. For example, the elevation associated with the first trusted point is referred to, and the first elevation is corrected such that the first elevation difference becomes equal to or less than the first threshold value of the elevation. The corrected elevation is stored as the corrected elevation in the corrected elevation storing portion 67.

In the above, the special target entrance elevation specifying device 61 is provided with the elevation correcting portion 65 and the corrected elevation storing portion 67. However, the correcting portion 65 and the storing portion 67 may not be provided. Alternatively, when the validity determining portion 63 determines that the first elevation is not valid, the first elevation may be cancelled.

Figure 16:
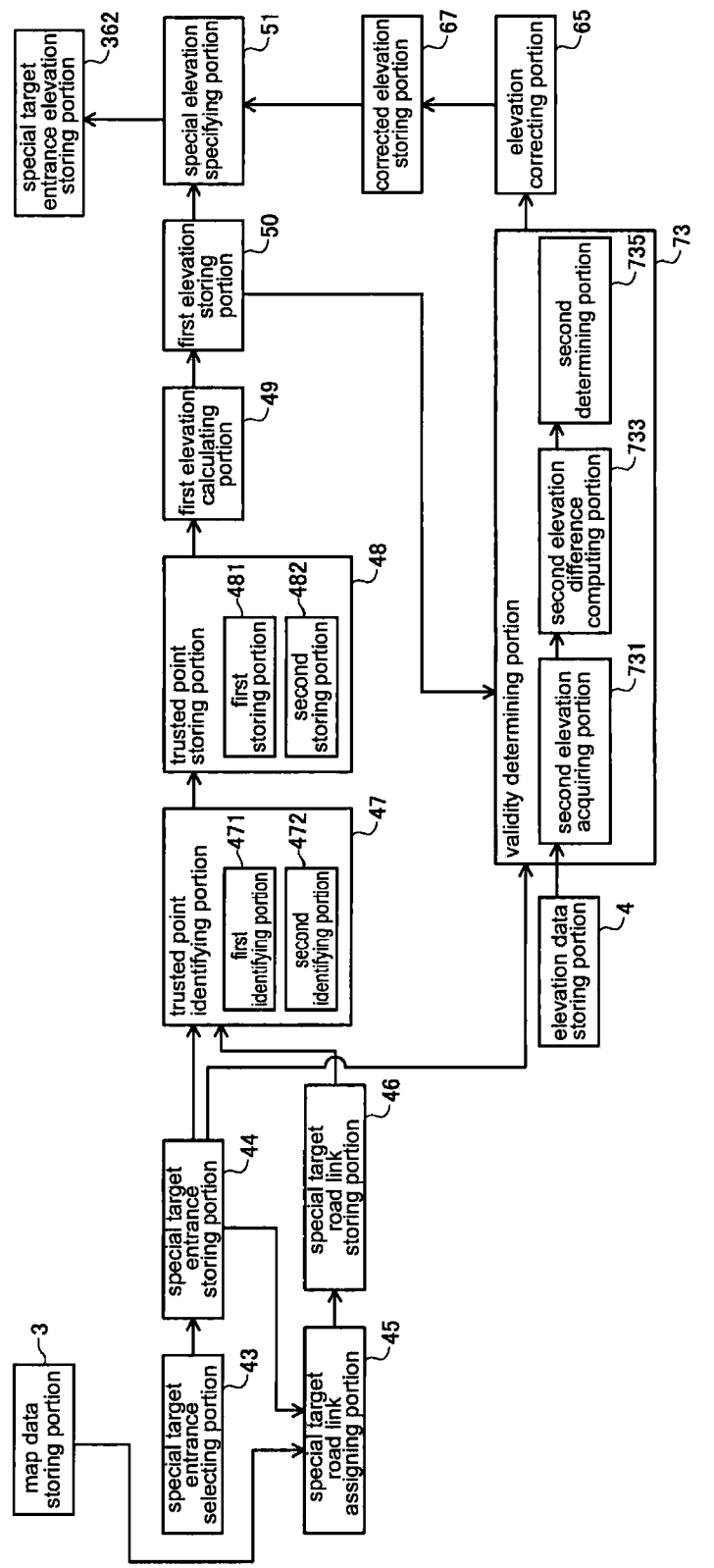
FIG. 16 is a block diagram illustrating a configuration of a special target entrance elevation specifying device according to yet further another embodiment of the present invention.

FIG. 16 illustrates a special target entrance elevation specifying device 71 according to yet further another embodiment. Components in FIG. 16 similar to those in FIG. 1, FIG. 3, FIG. 7, FIG. 8, FIG. 12, and FIG. 15 will be indicated with the same numerals, and the description of the components will be partially omitted.

The special target entrance elevation specifying device 71 shown in FIG. 16 further includes the elevation data storing portion 4, a validity determining portion 73, the elevation correcting portion 65, and the corrected elevation storing portion 67 in addition to the components of the special target entrance elevation specifying device 41 in FIG. 12.

The validity determining portion 73 includes a second elevation acquiring portion 731, a second elevation difference computing portion 733, and a second determining portion 735. The validity determining portion 73 refers to the special target entrance storing portion 44, the first elevation storing portion 50, and the elevation data storing portion 4 to determine whether the first elevation is valid.

The second elevation acquiring portion 731 refers to the special target entrance storing portion 44 and the elevation data storing portion 4, and acquires the elevation of the special target entrance from the mesh elevation data sets.

The second elevation difference computing portion 733 refers to the first elevation storing portion 50, and computes a difference (second elevation difference) between the first elevation of the special target entrance and the second elevation acquired by the second elevation acquiring portion 731.

The second determining portion 735 determines that the first elevation is not valid when the second elevation difference is equal to or greater than a predefined second threshold value. On the other hand, the second determining portion 735 determines that the first elevation is valid when the second elevation difference is less than the second threshold value.

Alternatively to the above method, the elevation correcting portion 65 may correct the first elevation to be the second elevation during the correction of the first elevation that is determined as invalid by the validity determining portion 73.

Also, other than the above, the validity determining portion may alternatively determine the validity of the first elevation based on the distance between the first trusted point (and/or the second trusted point) and the special target entrance. More specifically, the validity determining portion determines that the first elevation is not valid when the special target entrance is a distance away from the first trusted point, the distance being equal to or greater than a certain value (for example, 1 km).

Figure 17:
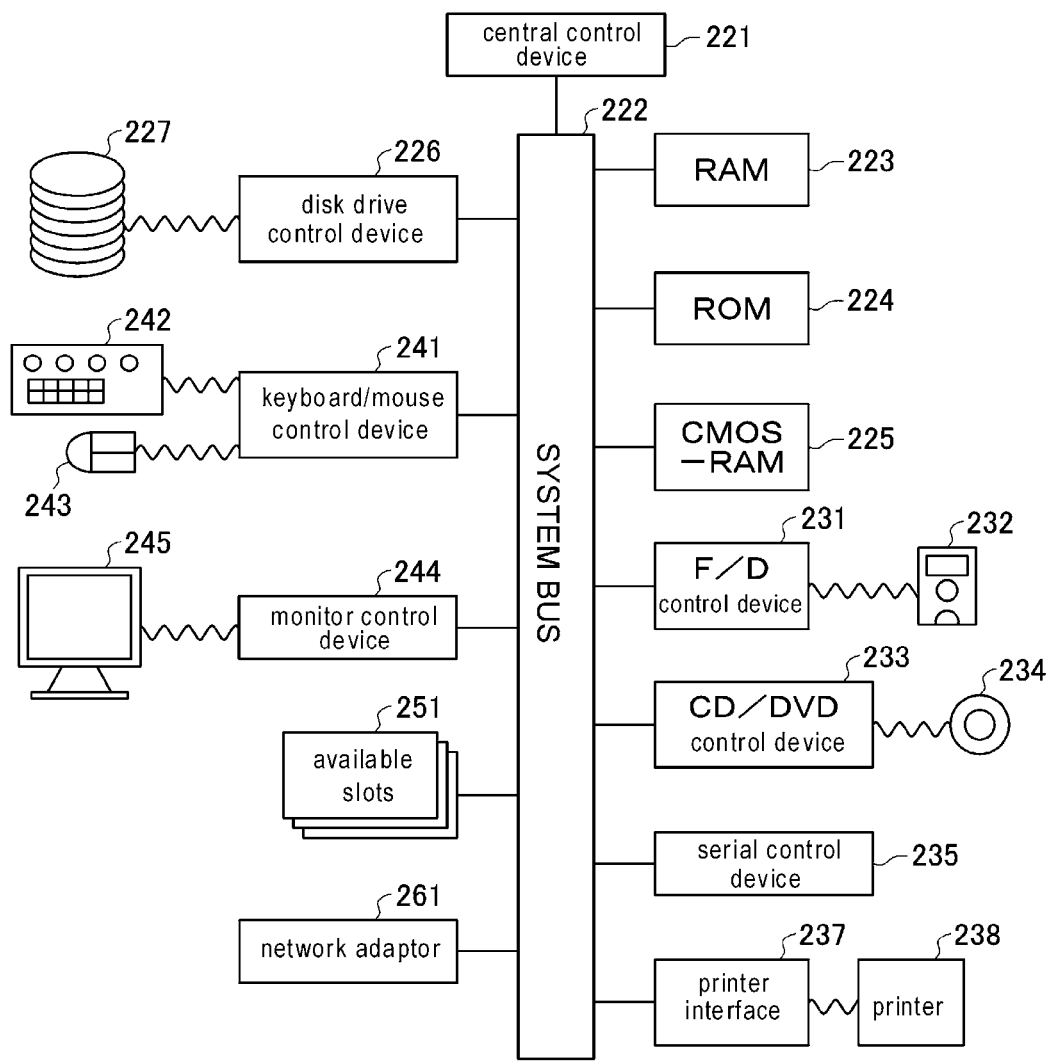
FIG. 17 is a block diagram illustrating a hardware configuration of the special target entrance elevation specifying device according to the yet another embodiment of the present invention.

FIG. 17 is a block diagram illustrating the hardware configuration of the special target entrance elevation specifying device 41.

The device 41 has a hardware configuration, where a central control device 221 is connected with various components through a system bus 222, similarly to a general computer system.

The central control device 221 includes a general CPU, a memory control device, a bus control device, an interrupt control device, and a DMA (direct memory access) device. The system bus 222 includes a data line, an address line, and a control line. The system bus 222 is connected to a memory circuit that includes a RAM (random access memory) 223 and nonvolatile memories (ROM 224, CMOS-RAM 225). The data stored in the RAM 223 is read and rewritten by the central control device 221 and other hardware components. The data of the nonvolatile memories is read-only, and remains stored even when the device is turned off. System programs for controlling the hardware are stored in a hard disk drive 227 and in the RAM 223. The system programs are retrieved and used by the central control device 221 as required through a disk drive control device 226. The hard disk drive 227 has an area for storing computer programs that cause a computer system having a general configuration to operate as the special target entrance elevation specifying device 41.

A predetermined area of the hard disk drive 227 is assigned to a storing portion that stores the results specified by the special elevation specifying portion 51.

Other areas of the hard disk drive 227 are assigned to the map data storing portion 3.

The system bus 222 is connected to a flexible drive control device 231 and a CD/DVD control device 233. The flexible drive control device 231 reads data from and writes data to a flexible disk 232. The CD/DVD control device 233 retrieves data from the compact disc 234. In this example, a printer interface 237 is connected to a printer 238.

The system bus 222 is connected to a keyboard/mouse control device 241, and is capable of receiving data from a keyboard 242 and a mouse 243. A monitor 245 is connected to the system bus 222 through a monitor control device 244. The monitor 245 may employ a CRT type monitor, a liquid crystal type monitor, or a plasma display type monitor.

Slots 251 are available for the additional various components (such as a modem).

Programs (OS program, application program (including the application of the present invention)) required for operating the special target entrance elevation specifying device 41 constituted by the above computer system are installed on the system through various storage media. For example, programs are installable through a non-writable storage medium (CD-ROM, ROM card, etc.), a writable storage medium (FD, DVD, etc.). Furthermore, programs may be installed through a network N as a format of a communication medium. Programs may be pre-stored in the nonvolatile memories 224, 225 and the hard disk drive 227.

Although the embodiments of the present invention are described as above, two or more of the above embodiments may be combined and executed. Alternatively, only a part of one of the embodiments may be executed. Furthermore, parts of two or more of the embodiments may be combined and executed.

The invention is not limited to the description of the embodiments or the examples of the above invention. The invention includes various modifications provided that the various modifications do not depart from the description of appended claims and are easily made by those skilled in the art.

DESCRIPTION OF THE NUMERALS 1 tunnel entrance specifying device
3 map data storing portion
4 elevation data storing portion
5 target entrance selecting portion
7 target road link assigning portion
9 elevation acquiring portion
11 on-link boundary point identifying portion
13 target entrance elevation/position specifying portion
21 flat segment extracting portion
22 slope segment extracting portion
23 first straight line forming portion
24 second straight line forming portion
25 intersection point identifying portion

The invention claimed is:

1. A tunnel entrance elevation specifying device configured to validate or correct electronic map information, including a computer system having a non-transitory computer-readable storage medium containing programming for tunnel entrance elevation specifying, comprising:
    an electronic map data storing portion configured to store an electronic map information;
    a special target entrance selecting portion configured to select a tunnel entrance, which is connected to an elevated road, from the electronic map data storing portion, the tunnel entrance serving as a special target entrance;
    a special target road link assigning portion configured to assign a road link, which includes the special target entrance, as a special target road link, the road link being retrieved from the electronic map data storing portion;
    a trusted point identifying portion configured to identify first and second trusted points located on the special target road link, the first and second trusted points having the special target entrance located therebetween;
    a first elevation calculating portion configured to calculate a first elevation corresponding to coordinates for the special target entrance by performing linear interpolation on elevation values associated with the identified first and second trusted points;
    a special target entrance elevation specifying portion configured to specify the calculated first elevation as an elevation of the special target entrance;
    a second elevation acquiring portion configured to acquire a second elevation of the special target entrance by performing linear interpolation using electronic mesh elevation data sets for four points surrounding the special target entrance;
    a validity determining portion configured to determine that the first elevation is not valid when a difference between the first elevation and the second elevation is equal to or greater than a second threshold value; and
    a correcting portion configured to correct the first elevation when the validity determining portion determines that the first elevation is not valid or not to correct the first elevation when the validity determining portion determines that the first elevation is valid; wherein
    the trusted point identifying portion acquires elevations for a predetermined region that includes an arbitrary point on the special target road link; and
    the trusted point identifying portion identifies a boundary point between a flat part and a slope part on the special target road link as the trusted point.

2. The tunnel entrance elevation specifying device according to claim 1, wherein:
    the validity determining portion determines that the first elevation is not valid when a difference between the first elevation and an elevation associated with the first trusted point is equal to or greater than a first threshold value, and/or when a difference between the first elevation and an elevation associated with the second trusted point is equal to or greater than the first threshold value.

3. The tunnel entrance elevation specifying device according to claim 1, wherein:
    the correcting portion is configured to correct the first elevation so that the first elevation difference becomes equal to or less than a predefined value of the elevations associated with one or both of the first trusted point and the second trusted point.

4. A tunnel entrance elevation specifying device configured to validate or correct electronic map information, including a computer system having a non-transitory computer-readable storage medium containing programming for tunnel entrance elevation specifying, comprising:
    an electronic map data storing portion configured to store an electronic map information;
    a special target entrance selecting portion configured to select a tunnel entrance, which is connected to an elevated road, from the electronic map data storing portion, the tunnel entrance serving as a special target entrance;
    a special target road link assigning portion configured to assign a road link, which includes the special target entrance, as a special target road link, the road link being retrieved from the electronic map data storing portion;

a trusted point identifying portion configured to identify first and second trusted points located on the special target road link, the first and second trusted points having the special target entrance located therebetween;

a first elevation calculating portion configured to calculate a first elevation corresponding to coordinates for the special target entrance by performing linear interpolation on elevation values associated with the identified first and second trusted points;

a special target entrance elevation specifying portion configured to specify the calculated first elevation as an elevation of the special target entrance;

a validity determining portion configured to determine that the first elevation is not valid when the first trusted point and/or the second trusted point is a distance away from the special target entrance, the distance being equal to or greater than a certain value; and a correcting portion configured to correct the first elevation when the validity determining portion determines that the first elevation is not valid or not to correct the first elevation when the validity determining portion determines that the first elevation is valid; wherein the trusted point identifying portion acquires elevations for a predetermined region that includes an arbitrary point on the special target road link; and the trusted point identifying portion identifies a boundary point between a flat part and a slope part on the special target road link as the trusted point.

5. A method for specifying a tunnel entrance elevation using a computer system configured to validate or correct electronic map information and having a non-transitory computer-readable storage medium containing programming for tunnel entrance elevation specifying, comprising:

an electronic map data storing step for storing electronic map information;

a special target entrance selecting step for selecting a tunnel entrance, which is connected to an elevated road, from an electronic map data included in the electronic map information stored in the storing step, the tunnel entrance serving as a special target entrance;

a special target road link assigning step for assigning a road link, which includes the special target entrance, as a special target road link, the road link being retrieved from the electronic map data stored in the storing step;

a trusted point identifying step for identifying first and second trusted points located on the special target road link, the first and second trusted points having the special target entrance located therebetween;

a first elevation calculating step for calculating a first elevation corresponding to coordinates for the special target entrance by performing linear interpolation on elevation values associated with the identified first and second trusted points;

a special target entrance elevation specifying step for specifying the calculated first elevation as an elevation of the special target entrance;

a second elevation acquiring step for acquiring a second elevation of the special target entrance by performing linear interpolation using electronic mesh elevation data sets for four points surrounding the special target entrance;

a validity determining step for determining that the first elevation is not valid when a difference between the first elevation and the second elevation is equal to or greater than a second threshold value; and a correcting step for correcting the first elevation when the validity determining step determines that the first elevation is not valid or not to correct the first elevation when the validity determining step determines that the first elevation is valid; wherein the trusted point identifying step acquires elevations for a predetermined region that includes an arbitrary point on the special target road link; and the trusted point identifying step identifies a boundary point between a flat part and a slope part on the special target road link as the trusted point.

6. The method for specifying the tunnel entrance elevation according to claim 5, wherein:

the validity determining step determines that the first elevation is not valid when a difference between the first elevation and an elevation associated with the first trusted point is equal to or greater than a first threshold value, and/or when a difference between the first elevation and an elevation associated with the second trusted point is equal to or greater than the first threshold value.

7. The tunnel entrance elevation specifying method according to claim 5, wherein:

the correcting step corrects the first elevation when the validity determining step determines that the first elevation is not valid so that the first elevation difference becomes equal to or less than a predefined value of the elevations associated with one or both of the first trusted point and the second trusted point.

8. A method for specifying a tunnel entrance elevation using a computer system configured to validate or correct electronic map information and having a non-transitory computer-readable storage medium containing programming for tunnel entrance elevation specifying, comprising:

an electronic map data storing step for storing electronic map information;

a special target entrance selecting step for selecting a tunnel entrance, which is connected to an elevated road, from an electronic map data included in the electronic map information stored in the storing step, the tunnel entrance serving as a special target entrance;

a special target road link assigning step for assigning a road link, which includes the special target entrance, as a special target road link, the road link being retrieved from the electronic map data stored in the storing step;

a trusted point identifying step for identifying first and second trusted points located on the special target road link, the first and second trusted points having the special target entrance located therebetween;

a first elevation calculating step for calculating a first elevation corresponding to coordinates for the special target entrance by performing linear interpolation on elevation values associated with the identified first and second trusted points;

a special target entrance elevation specifying step for specifying the calculated first elevation as an elevation of the special target entrance;

a validity determining step for determining that the first elevation is not valid when the first trusted point and/or the second trusted point is a distance away from the special target entrance, the distance being equal to or greater than a certain value;

a correcting step for correcting the first elevation when the validity determining step determines that the first elevation is not valid or not to correct the first elevation when the validity determining step determines that the first elevation is valid; wherein the trusted point identifying step acquires elevations for a predetermined region that includes an arbitrary point on the special target road link; and the trusted point identifying step identifies a boundary point between a flat part and a slope part on the special target road link as the trusted point.

* * * * *